(12) United States Patent
Rice et al.

(10) Patent No.: US 10,464,584 B2
(45) Date of Patent: Nov. 5, 2019

(54) REDUNDANT METHOD OF CONFIRMING AN ECP PENALTY

(71) Applicant: Westinghouse Air Brake Technologies Corporation, Wilmerding, PA (US)

(72) Inventors: Danial Rice, Frederick, MD (US); Charles L. Wolf, Olney, MD (US); Alan Laurence Cortie, Baltimore, MD (US); Paul Gerard Bender, Clarksburg, MD (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 477 days.

(21) Appl. No.: 15/240,429

(22) Filed: Aug. 18, 2016

(65) Prior Publication Data

US 2018/0050711 A1   Feb. 22, 2018

(51) Int. Cl.
| | | |
|---|---|---|
| *B61L 23/14* | (2006.01) | |
| *B61H 13/00* | (2006.01) | |
| *B61L 23/02* | (2006.01) | |
| *B61L 15/00* | (2006.01) | |
| *B60T 13/66* | (2006.01) | |
| *B60T 17/22* | (2006.01) | |

(52) U.S. Cl.
CPC ............ *B61L 23/14* (2013.01); *B60T 13/665* (2013.01); *B60T 17/228* (2013.01); *B61H 13/00* (2013.01); *B61L 15/0036* (2013.01); *B61L 15/0081* (2013.01); *B61L 23/02* (2013.01); *B61L 2201/00* (2013.01)

(58) Field of Classification Search
CPC ........ B61L 23/14; B61L 23/02; B60T 13/665; B60T 13/00
See application file for complete search history.

(56) References Cited

U.S. PATENT DOCUMENTS

| | | | | |
|---|---|---|---|---|
| 6,229,452 B1* | 5/2001 | Kull | ...................... | B60T 13/665 246/1 C |
| 6,334,654 B1* | 1/2002 | Root | ..................... | B60T 13/662 303/15 |
| 6,676,229 B1* | 1/2004 | Marra | .................... | B60T 13/665 303/7 |
| 8,028,961 B2* | 10/2011 | Ashraf | ..................... | B61L 29/22 246/167 R |
| 8,714,494 B2* | 5/2014 | Weber | ................. | B61L 15/0063 246/122 R |
| 2008/0269013 A1* | 10/2008 | Minaki | .................... | F16H 59/48 477/86 |
| 2018/0050711 A1* | 2/2018 | Rice | .................... | B61L 15/0036 |

\* cited by examiner

*Primary Examiner* — Jason C Smith
(74) *Attorney, Agent, or Firm* — The Webb Law Firm (57) ABSTRACT

A train control system and method for use in an electronically-controlled pneumatic (ECP)-equipped train having a lead locomotive or control car, at least one railroad car and, optionally, at least one trailing locomotive or control car. A first controller or computer generates a train brake command and directly or indirectly transmit the train brake command to the at least one railroad car. A second controller or computer separate from the first controller or computer determines transmission of the train brake command to the at least one railroad car.

21 Claims, 4 Drawing Sheets

REDUNDANT METHOD OF CONFIRMING AN ECP PENALTY

BACKGROUND OF THE INVENTION

Field of the Invention

This invention relates generally to vehicle systems and control processes, such as railway systems including trains travelling in a track or rail network, and in particular to a train control system and method that may be used in connection with electronically-controlled pneumatic (ECP) operations.

Description of Related Art

Vehicle systems and networks exist throughout the world, and, at any point in time, a multitude of vehicles, such as cars, trucks, buses, trains, and the like, are travelling throughout the system and network. With specific reference to trains travelling in a track network, the locomotives of such trains are typically equipped with or operated using train control, communication, and management systems (e.g., positive train control (PTC) systems), such as the I-ETMS® of Wabtec Corp. In order to effectively manage all of the trains, navigation and enforcement systems and processes are implemented, both at the train level and the central dispatch level.

An electronically-controlled pneumatic (ECP)-equipped train relies on electronic signals, rather than changes in brake pipe air pressure, to activate brake valves on individual railcars. The performance and requirements of ECP braking systems are defined by a series of open standards and recommended practices published by the Association of American Railroads (AAR). The primary document is: AAR S-4200: ELECTRONICALLY-CONTROLLED PNEUMATIC (ECP) CABLE-BASED BRAKE SYSTEMS—PERFORMANCE REQUIREMENTS. The AAR S-4200 series of documents is applicable to all ECP system designs in the United States, but has become the recognized standard internationally as well.

With respect to conventional ECP braking systems, when an external penalty input is active (e.g., during a cab signal or other penalty condition), the head end unit (HEU) typically transmits a Train Brake Command (TBC) of 100% (i.e., a full service brake command) on the trainline to the ECP devices in the individual railcars to instruct the individual railcars to apply brakes. The TBC is communicated as a percentage, for example, a "0% TBC" indicates that ECP brakes are being commanded to release, while a "100% TBC" signifies that ECP brakes are being commanded to deliver a full (i.e., maximum) brake application. A penalty brake application of ECP brakes (i.e., an ECP brake application typically initiated by an external safety system to override a train operator's control) is always a "100% TBC" command from the HEU. However, in conventional ECP operations, a single point failure involving the HEU, for example, a software or hardware failure of the HEU, can prevent the TBC from being successfully transmitted to the railcars. For example, it is possible that the other ECP devices on the railcars may receive a TBC of "0%" when the ECP system is requesting a penalty brake TBC of "100%". This failure is a significant safety risk, because it allows ECP brakes to remain released in a situation where an external safety system is attempting to apply the ECP brakes. If a fault prevents the TBC from being successfully transmitted, it is left to the operator to manually apply a pneumatic emergency brake application.

For at least these reasons, there is a need in the art for improved systems and methods for ECP operations.

SUMMARY OF THE INVENTION

Generally, provided are an improved train control system and computer-implemented method, preferably for use in connection with electronically-controlled pneumatic (ECP)-equipped trains travelling in a track network. Preferably, provided are a train control system and computer-implemented method that provide communication redundancy that improves safety and tolerance of single-point failures in ECP operations. Preferably, provided are a train control system and computer-implemented method that provide a redundant processor or computer that independently verifies that a desired train brake command (TBC) during a penalty brake application is actually transmitted on a trainline connecting a lead locomotive or control car to at least one railroad car in the train.

According to one preferred and non-limiting embodiment or aspect, provided is a train control system for use in an electronically-controlled pneumatic (ECP)-equipped train having a lead locomotive or control car, at least one railroad car and, optionally, at least one trailing locomotive or control car, the system comprising: on the lead locomotive or control car: a first controller or computer programmed or configured to generate a train brake command and directly or indirectly transmit the train brake command to the at least one railroad car; and a second controller or computer separate from the first controller or computer and programmed or configured to determine transmission of the train brake command to the at least one railroad car.

In one preferred and non-limiting embodiment or aspect, the second controller or computer is programmed or configured to determine transmission of the train brake command on a trainline connecting the lead locomotive or control car to the at least one railroad car.

In one preferred and non-limiting embodiment or aspect, the second controller or computer is programmed or configured to determine transmission of the train brake command on a wireless communication protocol to the at least one railroad car.

In one preferred and non-limiting embodiment or aspect, the second controller or computer is programmed or configured to automatically implement or facilitate a pneumatic emergency brake application based on the determination of the transmission of the train brake command to the at least one railroad car.

In one preferred and non-limiting embodiment or aspect, the second controller or computer is programmed or configured to automatically implement or facilitate an external penalty brake request to trigger the pneumatic emergency brake application.

In one preferred and non-limiting embodiment or aspect, the second controller or computer is programmed or configured to automatically implement or facilitate the external penalty brake request to trigger the pneumatic emergency brake application based on a determination that the train brake command is less than a 100% command.

In one preferred and non-limiting embodiment or aspect, the second controller or computer is programmed or configured to automatically implement or facilitate the external penalty brake request to trigger the pneumatic emergency brake application by allowing a relay on a signal path to an external safety relay to remain closed to allow the external penalty brake request to trigger the pneumatic emergency brake application.

In one preferred and non-limiting embodiment or aspect, the second controller or computer is programmed or configured to automatically prevent an external penalty brake request from triggering a pneumatic emergency brake application based on the determination of the transmission of the train brake command to the at least one railroad car.

In one preferred and non-limiting embodiment or aspect, the second controller or computer is programmed or configured to automatically prevent the external penalty brake request from triggering the pneumatic emergency brake application based on a determination that the train brake command is greater than or equal to a 100% command.

In one preferred and non-limiting embodiment or aspect, the second controller or computer is programmed or configured to automatically prevent the external penalty brake request from triggering the pneumatic emergency brake application by controlling a relay on a signal path to an external safety relay to open to prevent the external penalty brake request from triggering the pneumatic emergency brake application via the external safety relay.

In one preferred and non-limiting embodiment or aspect, the second controller or computer comprises a power supply controller.

According to one preferred and non-limiting embodiment or aspect, a computer-implemented method for use in an electronically-controlled pneumatic (ECP)-equipped train having a lead locomotive or control car, at least one railroad car and, optionally, at least one trailing locomotive or control car, the method comprising: generating, by a first controller or computer on the lead locomotive or control car, a train brake command and directly or indirectly transmitting the train brake command to the at least one railroad car; and determining, by a second controller or computer on the lead locomotive or control car and separate from the first controller or computer, transmission of the train brake command to the at least one railroad car.

In one preferred and non-limiting embodiment or aspect, the determining transmission of the train brake command comprises determining transmission of the train brake command on a trainline connecting the lead locomotive or control car to the at least one railroad car.

In one preferred and non-limiting embodiment or aspect, the determining transmission of the train brake command comprises determining transmission of the train brake command on a wireless communication protocol to the at least one railroad car.

In one preferred and non-limiting embodiment or aspect, the method further includes automatically implementing or facilitating a pneumatic emergency brake application based on the determination of the transmission of the train brake command to the at least one railroad car.

In one preferred and non-limiting embodiment or aspect, the method further includes automatically implementing or facilitating an external penalty brake request to trigger the pneumatic emergency brake application.

In one preferred and non-limiting embodiment or aspect, the method further includes automatically implementing or facilitating the external penalty brake request to trigger the pneumatic emergency brake application based on a determination that the train brake command is less than a 100% command.

In one preferred and non-limiting embodiment or aspect, the method further includes automatically implementing or facilitating the external penalty brake request to trigger the pneumatic emergency brake application by allowing a relay on a signal path to an external safety relay to remain closed to allow the external penalty brake request to trigger the pneumatic emergency brake application.

In one preferred and non-limiting embodiment or aspect, the method further includes automatically preventing an external penalty brake request from triggering a pneumatic emergency brake application based on the determination of the transmission of the train brake command to the at least one railroad car.

In one preferred and non-limiting embodiment or aspect, the method further includes automatically preventing the external penalty brake request from triggering the pneumatic emergency brake application based on a determination that the train brake command is greater than or equal to a 100% command.

In one preferred and non-limiting embodiment or aspect, the method further includes automatically preventing the external penalty brake request from triggering the pneumatic emergency brake application by controlling a relay on a signal path to an external safety relay to open to prevent the external penalty brake request from triggering the pneumatic emergency brake application via the external safety relay.

In one preferred and non-limiting embodiment or aspect, the method further includes implementing or facilitating an ECP penalty brake application based on the determination of the transmission of the train brake command to the at least one railroad car.

According to one preferred and non-limiting embodiment or aspect, a train control system for use in an electronically-controlled pneumatic (ECP)-equipped train having a lead locomotive or control car, at least one railroad car and, optionally, at least one trailing locomotive or control car, the system comprising: on the lead locomotive or control car: a first controller or computer programmed or configured to generate a train brake command on a trainline connecting the lead locomotive or control car to the at least one railroad car; and a second controller or computer programmed or configured to monitor the trainline for the train brake command and control application of a pneumatic emergency brake based on a presence of the train brake command on the trainline.

According to one preferred and non-limiting embodiment or aspect, a computer-implemented method for use in an electronically-controlled pneumatic (ECP)-equipped train having a lead locomotive or control car, at least one railroad car and, optionally, at least one trailing locomotive or control car, the method comprising: monitoring a trainline connecting the lead locomotive or control car to the at least one railroad car for a train brake command; and controlling application of a pneumatic emergency brake based on the monitoring.

Other preferred and non-limiting embodiment or aspects of the present invention will be set forth in the following numbered clauses:

Clause 1, A train control system for use in an electronically-controlled pneumatic (ECP)-equipped train having a lead locomotive or control car, at least one railroad car and, optionally, at least one trailing locomotive or control car, the system comprising: on the lead locomotive or control car: a first controller or computer programmed or configured to generate a train brake command and directly or indirectly transmit the train brake command to the at least one railroad car; and a second controller or computer separate from the first controller or computer and programmed or configured to determine transmission of the train brake command to the at least one railroad car.

Clause 2, The train control system of clause 1, wherein the second controller or computer is programmed or configured to determine transmission of the train brake command on a trainline connecting the lead locomotive or control car to the at least one railroad car.

Clause 3, The train control system of clause 1 or 2, wherein the second controller or computer is programmed or configured to determine transmission of the train brake command on a wireless communication protocol to the at least one railroad car.

Clause 4, The train control system of any of clauses 1-3, wherein the second controller or computer is programmed or configured to automatically implement or facilitate a pneumatic emergency brake application based on the determination of the transmission of the train brake command to the at least one railroad car.

Clause 5, The train control system of any of clauses 1-4, wherein the second controller or computer is programmed or configured to automatically implement or facilitate an external penalty brake request to trigger the pneumatic emergency brake application.

Clause 6, The train control system of any of clauses 1-5, wherein the second controller or computer is programmed or configured to automatically implement or facilitate the external penalty brake request to trigger the pneumatic emergency brake application based on a determination that the train brake command is less than a 100% command.

Clause 7, The train control system of any of clauses 1-6, wherein the second controller or computer is programmed or configured to automatically implement or facilitate the external penalty brake request to trigger the pneumatic emergency brake application by allowing a relay on a signal path to an external safety relay to remain closed to allow the external penalty brake request to trigger the pneumatic emergency brake application.

Clause 8, The train control system of any of clauses 1-7, wherein the second controller or computer is programmed or configured to automatically prevent an external penalty brake request from triggering a pneumatic emergency brake application based on the determination of the transmission of the train brake command to the at least one railroad car.

Clause 9, The train control system of any of clauses 1-8, wherein the second controller or computer is programmed or configured to automatically prevent the external penalty brake request from triggering the pneumatic emergency brake application based on a determination that the train brake command is greater than or equal to a 100% command.

Clause 10, The train control system of any of clauses 1-9, wherein the second controller or computer is programmed or configured to automatically prevent the external penalty brake request from triggering the pneumatic emergency brake application by controlling a relay on a signal path to an external safety relay to open to prevent the external penalty brake request from triggering the pneumatic emergency brake application via the external safety relay.

Clause 11, The train control system of any of clauses 1-10, wherein the second controller or computer comprises a power supply controller.

Clause 12, A computer-implemented method for use in an electronically-controlled pneumatic (ECP)-equipped train having a lead locomotive or control car, at least one railroad car and, optionally, at least one trailing locomotive or control car, the method comprising: generating, by a first controller or computer on the lead locomotive or control car, a train brake command and directly or indirectly transmitting the train brake command to the at least one railroad car; and determining, by a second controller or computer on the lead locomotive or control car and separate from the first controller or computer, transmission of the train brake command to the at least one railroad car.

Clause 13, The method of clause 12, wherein the determining transmission of the train brake command comprises determining transmission of the train brake command on a trainline connecting the lead locomotive or control car to the at least one railroad car.

Clause 14, The method of clause 12 or 13, wherein the determining transmission of the train brake command comprises determining transmission of the train brake command on a wireless communication protocol to the at least one railroad car.

Clause 15, The method of any of clauses 12-14, further comprising automatically implementing or facilitating a pneumatic emergency brake application based on the determination of the transmission of the train brake command to the at least one railroad car.

Clause 16, The method of any of clauses 12-15, further comprising automatically implementing or facilitating an external penalty brake request to trigger the pneumatic emergency brake application.

Clause 17, The method of any of clauses 12-16, further comprising automatically implementing or facilitating the external penalty brake request to trigger the pneumatic emergency brake application based on a determination that the train brake command is less than a 100% command.

Clause 18, The method of any of clauses 12-17, further comprising automatically implementing or facilitating the external penalty brake request to trigger the pneumatic emergency brake application by allowing a relay on a signal path to an external safety relay to remain closed to allow the external penalty brake request to trigger the pneumatic emergency brake application.

Clause 19, The method of any of clauses 12-18, further comprising automatically preventing an external penalty brake request from triggering a pneumatic emergency brake application based on the determination of the transmission of the train brake command to the at least one railroad car.

Clause 20, The method of any of clauses 12-18, further comprising automatically preventing the external penalty brake request from triggering the pneumatic emergency brake application based on a determination that the train brake command is greater than or equal to a 100% command.

Clause 21, The method of any of clauses 12-20, further comprising automatically preventing the external penalty brake request from triggering the pneumatic emergency brake application by controlling a relay on a signal path to an external safety relay to open to prevent the external penalty brake request from triggering the pneumatic emergency brake application via the external safety relay.

Clause 22, The method of any of clauses 12-21, further comprising implementing or facilitating an ECP penalty brake application based on the determination of the transmission of the train brake command to the at least one railroad car.

Clause 23, A train control system for use in an electronically-controlled pneumatic (ECP)-equipped train having a lead locomotive or control car, at least one railroad car and, optionally, at least one trailing locomotive or control car, the system comprising: on the lead locomotive or control car: a first controller or computer programmed or configured to generate a train brake command on a trainline connecting the lead locomotive or control car to the at least one railroad car; and a second controller or computer programmed or configured to monitor the trainline for the train brake command and control application of a pneumatic emergency brake based on a presence of the train brake command on the trainline.

Clause 24, A computer-implemented method for use in an electronically-controlled pneumatic (ECP)-equipped train having a lead locomotive or control car, at least one railroad car and, optionally, at least one trailing locomotive or control car, the method comprising: monitoring a trainline connecting the lead locomotive or control car to the at least one railroad car for a train brake command; and controlling application of a pneumatic emergency brake based on the monitoring.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PREFERRED EMBODIMENTS

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. It is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible. Any known electronic communication protocols and/or algorithms may be used such as, for example, TCP/IP (including HTTP and other protocols), WLAN (including 802.11 and other radio frequency-based protocols and methods), analog transmissions, and/or the like. It is to be noted that a "communication device" includes any device that facilitates communication (whether wirelessly or hard-wired (e.g., over the rails of a track, over a trainline extending between railcars of a train, and the like)) between two units, such as two locomotive units or control cars. In one preferred and non-limiting embodiment or aspect, the "communication device" is a radio transceiver programmed, configured, or adapted to wirelessly transmit and receive radio frequency signals and data over a radio signal communication path.

The present invention, including the various computer-implemented and/or computer-designed aspects and configures, may be implemented on a variety of computing devices and systems, wherein these computing devices include the appropriate processing mechanisms and computer-readable media for storing and executing computer-readable instructions, such as programming instructions, code, and the like. In addition, aspects of this invention may be implemented on existing controllers, control systems, and computers integrated or associated with, or positioned on, a locomotive or control car and/or any of the railroad cars. For example, the presently-invented system or any of its functional components can be implemented wholly or partially on a train management computer, a Positive Train Control computer, an on-board controller or computer, a railroad car computer, and the like. In addition, the presently-invented systems and methods may be implemented in a laboratory environment in one or more computers or servers. Still further, the functions and computer-implemented features of the present invention may be in the form of software, firmware, hardware, programmed control systems, microprocessors, and the like.

The train control system and computer-implemented method described herein may be implemented in a variety of systems and vehicular networks; however, the systems and methods described herein are particularly useful in connection with a railway system and network. Accordingly, the presently-invented methods and systems can be implemented in various known train control and management systems, e.g., the I-ETMS® of Wabtec Corp. The systems and methods described herein are useful in connection with and/or at least partially implemented on one or more locomotives or control cars (L) that make up a train (TR). It should be noted that multiple locomotives or control cars (L) may be included in the train (TR) to facilitate the reduction of the train (TR) to match with passenger (or some other) demand or requirement. Further, the method and systems described herein can be used in connection with commuter trains, freight trains, push-pull train configurations, and/or other train arrangements and systems. Still further, the train (TR) may be separated into different configurations (e.g., other trains (TR)) and moved in either a first direction and/or a second direction. Any configuration or arrangement of locomotives, control cars, and/or railroad cars may be designated as a train and/or a consist. Still further, it is to be expressly understood that the presently-invented methods and systems described herein may be implemented on and/or used in connection with an auxiliary vehicle, such as an auxiliary railroad vehicle, a maintenance vehicle or machine, a road vehicle (e.g., truck, pick-up truck, car, or other machine), a vehicle equipped to ride on the rails of the track, and/or the like.

In one preferred and non-limiting embodiment or aspect, the methods and systems described herein are used in connection with the locomotives or controls cars (L) that are positioned on each end of the train (TR), while in other preferred and non-limiting embodiments or aspects, the methods and systems described herein are used in connection with locomotives or control cars (L) that are positioned intermediately in the train (TR) (since these intermediate locomotives or control cars (L) may eventually become a controlling locomotive or control car (L) when the train (TR) is reconfigured). It is also noted that the methods and systems described herein may be used in connection with "electrical multiple unit" (EMU) or "diesel multiple unit" (DMU) configurations, where a locomotive does not technically exist, but multiple control cars would still be present. Still further, the train (TR) may include only one locomotive or control car (L) and/or some or no railroad cars.

As discussed hereinafter, the train control system and method of the present invention may be implemented by, programmed or configured on, or otherwise associated with any type of computer or processor, such as one or more of the following: a specially-programmed computer, an on-board controller, an on-board computer 10 (as discussed hereinafter), a train management computer, a remote server, a back office server, a wayside device, a PTC component, a networked computer, or any combination thereof. Accordingly, some or all of the steps in the system, process, and method discussed hereinafter may be implemented and/or executed on-board a locomotive or control car (L), and similarly, some or all of the steps in the system, process, and method discussed hereinafter may be implemented and/or executed by a computer or processor that is remote from the train (TR), where the remote computer or processor is in direct or indirect communication with a communication device 12 of the train (TR).

Figure 1A:
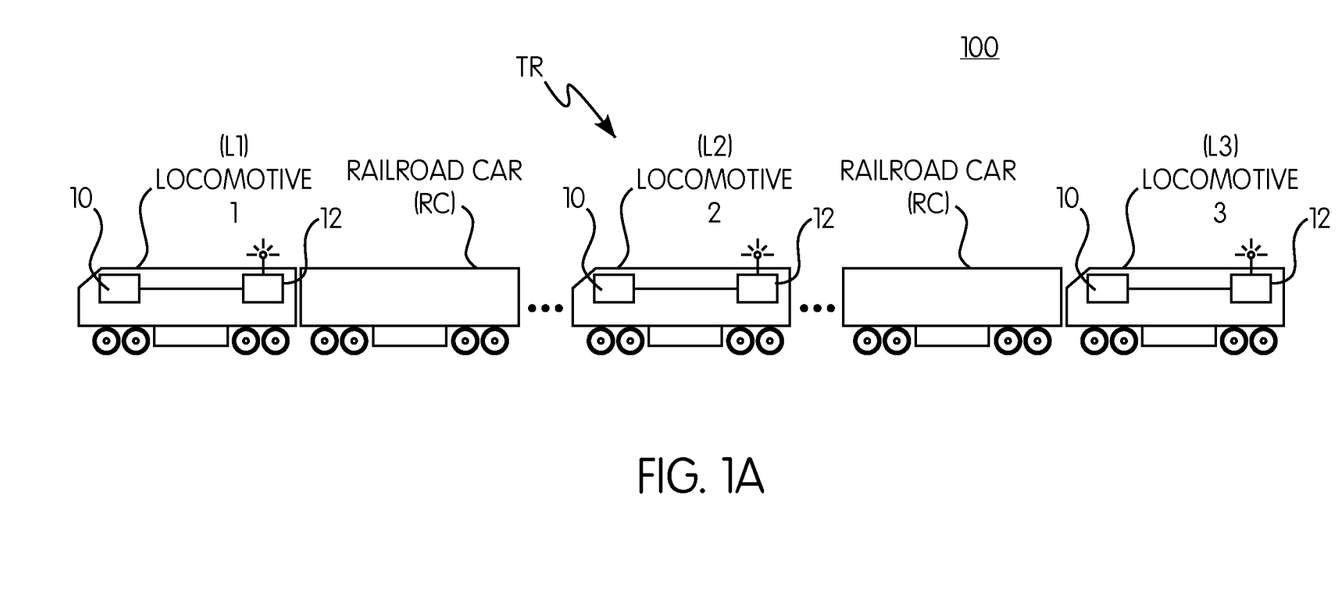
FIG. 1A is a schematic view of a train control system according to the principles of the present invention.
Figure 1B:
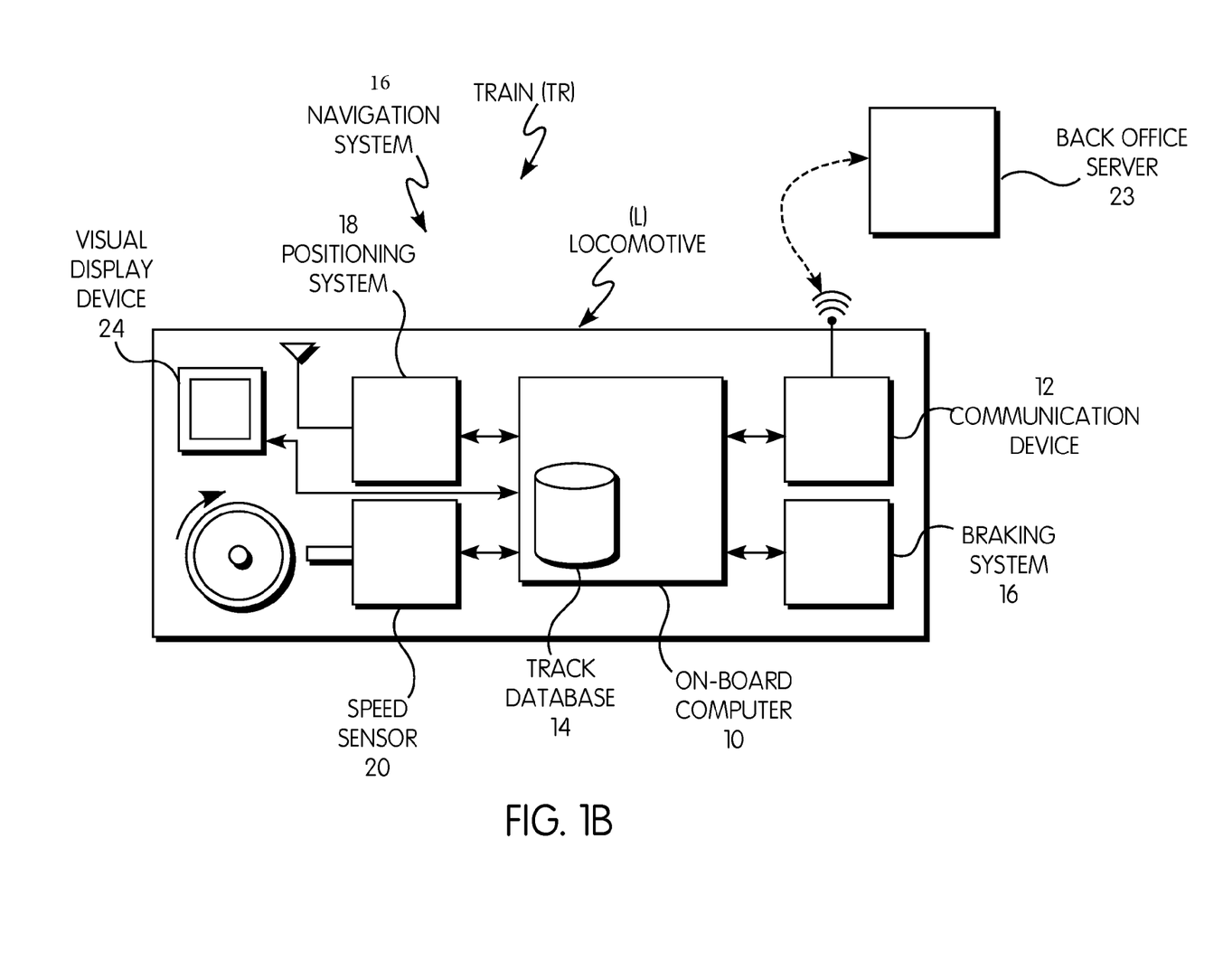
FIG. 1B is a schematic view of one embodiment of a train control system according to the principles of the present invention.

With specific reference to FIGS. 1A and 1B, and in one preferred and non-limiting embodiment or aspect, provided is a train brake control system 100 for a train (TR) including a lead locomotive or control car (L1) and at least one railcar (RC) and, optionally, at least one trailing locomotive or control car (L2, L3). Some embodiments may include additional or fewer locomotives (L) and/or railcars (RC). The locomotives (L1, L2, L3) and the railcars (RC) are connected to an electronically-controlled pneumatic (ECP) trainline 102 (FIG. 1C), such that data signals and power signals can be provided on and over the ECP trainline 102. Alternatively or, in addition, to the use of a trainline, radio communication control or some other wireless communication protocol can be utilized between the locomotives (L1, L2, L3) and/or the railcars (RC). The locomotives (L1, L2, L3) are equipped with at least an on-board computer 10 programmed or configured to implement or facilitate at least one train action and a communication device 12 in communication with the on-board computer 10 and programmed or configured to receive, transmit, and/or process data signals. While the communication device 12 may be in the form of a wireless communication device (as illustrated in FIG. 1A), as discussed herein, this communication device 12 may also be programmed or configured to transmit, process, and/or receive signals over the ECP trainline 102 (FIG. 1C), using an ECP component, over the rails, and/or the like.

The system architecture used to support the functionality of at least some of the methods and systems described herein includes: the train management computer or on-board computer 10 (which performs calculations for or within the Positive Train Control (PTC) system, including navigation and enforcement calculations); the communication device 12 (or data radio) (which may be used to facilitate the communications between the on-board computers 10 in one or more of the locomotives or control cars (L) of a train (TR), communications with a wayside device, e.g., signals, switch monitors, wayside devices, and the like, and/or communications with a remote server, e.g., a back office server 23, a central controller, central dispatch, and the like); a track database 14 (which may include information about track positions or locations, switch locations, crossing locations, track heading changes, e.g., curves, distance measurements, train information, e.g., the number of locomotives or control cars (L), the number of railcars (RC), the number of conventional passenger cars, the number of control cars, the total length of the train (TR), the specific identification numbers of each locomotive or control car (L) where PTC equipment (e.g., an on-board computer 10) is located, and the like); a navigation system 16 (optionally including a positioning system 18 (e.g., a Global Positioning System (GPS)) and/or a wheel tachometer/speed sensor 20), such as, in a PTC-equipped locomotive or control car (L); and a visual display device 24 (or operator interface), typically located in the locomotive or control car (L), which is in direct or indirect communication with the on-board computer 10 and provides information and data to a train operator, such as the information, data, and/or screens as discussed hereinafter. It should also be recognized that some or all of the steps and processing described herein may be performed locally by the on-board computer 10 of the locomotive or control car (L), or alternatively, by another computer (e.g., a computer associated with the end-of-train unit, a computer associated with a wayside device, and the like) and/or a remote computer or server (e.g., the back office server 23, a remote computer or server associated with central dispatch, a central controller, a computer-aided dispatch system, and intermediate control computer, and the like).

Further, and as discussed, the on-board computer 10 includes or is in communication with the communication device 12 (e.g., a data radio, a communication interface, a communication component, and/or the like), which facilitates communication by or between locomotives or control cars (L) and/or the locomotive or control car (L) and some remote server or computer system, e.g., a central controller, a back office server 23, a remote server, central dispatch, back office PTC components, various wayside devices, such as signal or switch monitors, or other on-board computers 10 in the railway system. Further, this communication may occur wirelessly or in a "hard wired" form, e.g., over the rails of the track.

As discussed, the on-board computer 10 may be located at any position or orientation on the train (TR), and the on-board computer 10 (or on-board controller, on-board computer system, train management computer, and/or the like, and which performs the determinations and/or calculations for the Positive Train Control (PTC) system) includes or is in communication with the track database 14 populated with data and/or which receives specified data and information from other trains, remote servers, back office servers 23, central dispatch, and/or the like, where this data may include track profile data, train data, information about switch locations, track heading changes (e.g., curves, and distance measurements), train consist information (e.g., the number of locomotives, the number of cars, the total length of the train (TR)), and/or the like. Of course, it is envisioned that any type of train management system can be used within the context and scope of the present invention.

Figure 1C:
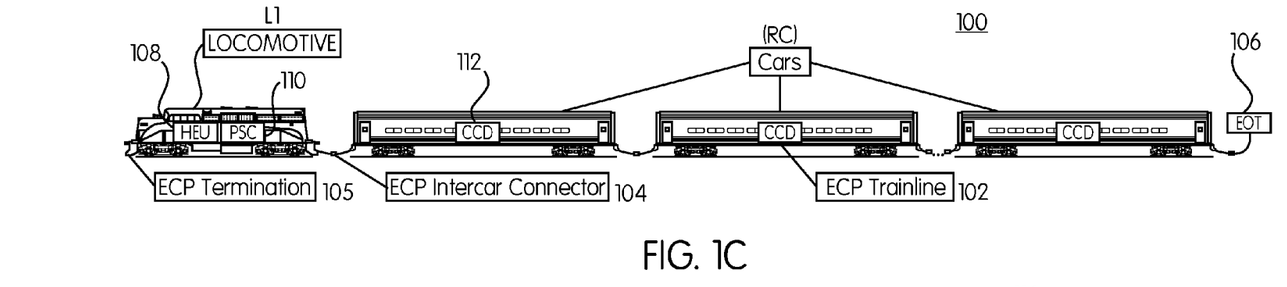
FIG. 1C is a schematic view of an electronically-controlled pneumatic (ECP) braking system according to principles of the present invention.

In one preferred and non-limiting embodiment or aspect, and with reference to FIG. 1C, the on-board computers 10 and communication devices 12 of the locomotives (L1, L2, L3) include or are integrated with one or more ECP controllers or computers of an ECP system configured to monitor and transmit data signals and power signals on the ECP trainline 102 and control ECP operations/braking. ECP-based air brake arrangements facilitate effective train operation by permitting all railcars (RC) of the train (TR) to apply and release brakes at the same time, instead of being limited by the propagation delay of basic pneumatic control. Instead, using the ECP system, the operator may simply issue or set a "Train Brake Command" (TBC), which is transmitted to all of the railcars simultaneously. Still further, such an ECP system improves safety by alerting the operator about any error conditions, e.g., if a car detects that it is unable to apply brakes, if a car detects that the brakes are or have been over applied, and the like. In addition, the ECP system is typically configured to monitor brake pipe pressure, reservoir pressure, and upstream brake cylinder pressure at the railcar level.

Still referring to FIG. 1C, the ECP train control brake system 100 includes computer-controlled electronics modules (ECP Nodes) distributed on each vehicle throughout the ECP train. The ECP equipment typically communicates via a hardwired computer network, i.e., the ECP trainline 102. The ECP trainline 102 extends the entire length of the train (TR). Interface between vehicles on the train (TR) is provided via an ECP intercar connector 104. Each ECP intercar connector 104 is manually mated to an adjacent ECP intercar connector 104, or terminated (i.e., looped back through an ECP termination interface 105). The train (TR) includes a locomotive (L1) and one or more railcars (RC) sequentially coupled thereto. The last railcar (RC) includes an end-of-train (EOT) unit 106 and the locomotive (L1) includes an ECP head-end-unit (HEU) 108, all communicatively connected via an electronically-controlled pneumatic (ECP) messaging network (whether in hard-wired or wireless form). The HOT locomotive (L1) is mechanically coupled to the first car (RC), and adjacent cars (RC) are mechanically coupled together. The ECP trainline 102 communicatively connects an ECP controller or computer of each locomotive (L1) or railcar (RC) to the ECP messaging network and, thereby, the HEU controller 108.

Figure 2:
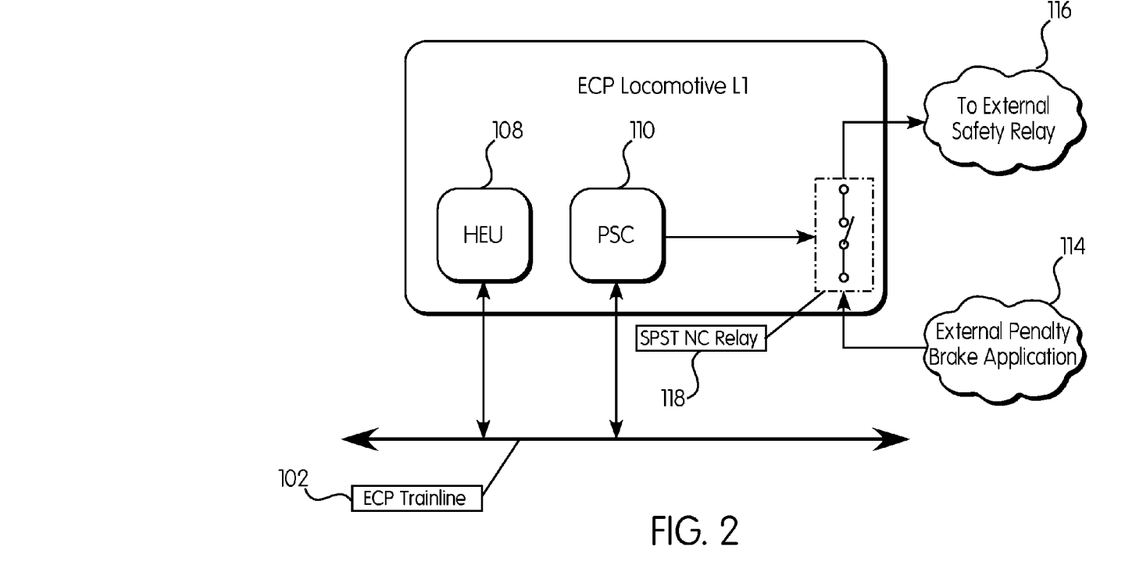
FIG. 2 is a schematic view of an ECP locomotive or control car according to principles of the present invention.

Referring to FIG. 2, each locomotive (L1, L2, L3) in the ECP train control brake system 100 hosts two ECP Nodes: the HEU 108 and a Power Supply Controller (PSC) 110. In one preferred and non-limiting embodiment or aspect, a first controller or computer on the lead locomotive or control car (L1) is programmed or configured to generate a TBC and directly or indirectly transmit the TBC to the at least one railroad car (RC). For example, the HEU is the "Master" in the ECP System, and is responsible for the Human-Machine Interface (HMI) and for controlling the overall ECP system including translating the train operator's brake handle position or a penalty brake request into a TBC and communicating the TBC to each of ECP devices in the system via the ECP trainline 102. A second controller or computer on the lead locomotive or control car (L1) and separate from the first controller or computer is programmed or configured to determine transmission of the TBC to the at least one railroad car (RC). The second controller or computer can be programmed or configured to monitor the ECP trainline 102 for the TBC and control application of a pneumatic emergency brake based on a presence of the TBC on the ECP trainline 102. For example, the PSC 110, which monitors and controls the ECP power supply under the direction of the HEU 108, via the ECP trainline 102, can monitor the trainline 102 for a presence of a TBC, and control application of a pneumatic emergency brake based on the presence (or absence) and/or percentage level of the TBC on the trainline 102.

Referring again to FIG. 1C, each railroad car (RC) in the ECP train control brake system 100 hosts an ECP node: a Car Control Device (CCD) 112. The train (TR) is further equipped with the End-Of-Train (EOT) unit 106, which can be placed on and/or behind the last car of the train (TR). The EOT unit 106 hosts an ECP node and is communicatively connected to the ECP trainline 102. The ECP nodes including the HEUs 108, the PSCs 110, the CCDs 112, and the EOT 106 are networked together and communicate with each other via the ECP trainline 102.

The second controller or computer is programmed or configured to determine transmission of the TBC on the ECP trainline 102 connecting the lead locomotive or control car (L1) to the at least one railroad car (RC). For example, the PSC 110 independently monitors the trainline 102 for TBCs issued by the HEU 108. However, it is noted that another device that is separate from the HEU 108 can be used to monitor the trainline 102 for TBCs issued by the HEU 108. For example, any train management computer, PTC computer, on-board controller or computer, or railroad car computer that is a separate device from the HEU 108 can be used to independently monitor the trainline 102 for a TBC issued by the HEU 108. The PSC 110 (or other device or controller) can directly monitor the trainline 102 or receive signals transmitted on the trainline 102 via another device or controller that directly monitors the trainline 102. In another preferred embodiment or aspect, the second controller or computer is programmed or configured to determine transmission of the TBC on a wireless communication protocol to the at least one railroad car (RC). For example, the PSC 110 (or other device or controller) can receive the TBC via a radio transceiver programmed, configured, or adapted to wirelessly transmit and receive radio frequency signals and data over a radio signal communication path.

In a preferred and non-limiting embodiment or aspect, the second controller or computer is programmed or configured to automatically implement or facilitate a pneumatic emergency brake application based on the determination of the transmission of the TBC to the at least one railroad car (RC), for example, based on a determination that the TBC is less than a 100% command. The second controller or computer can automatically implement or facilitate the pneumatic emergency brake application by controlling or allowing a relay on a signal path to an external safety relay 116 to remain closed to allow an external penalty brake request 114 to trigger the pneumatic emergency brake application. For example, if the PSC 110 detects a TBC of less than 100% has been issued by the HEU 108 on the ECP trainline 102, the PSC 110 ensures a signal path to allow an external penalty brake request 114, if present, to trigger a pneumatic emergency brake application via an external safety relay 116. The PSC 110 can be programmed or configured to control a relay 118 located on the signal path between the external penalty brake request 114 and the external safety relay 116. The relay 118 can be a single pose single throw (SPST) normally closed (NC) relay. The SPST NC relay is configured, in its default condition (i.e., NC condition), to apply an external penalty brake request 114 to drive the external safety relay 116 to cause a pneumatic emergency brake application to stop the train (TR). The PSC 110 is programmed or configured to control or allow the SPST NC relay 118 to remain closed when a TBC less than 100%.

In a preferred and non-limiting embodiment or aspect, the second controller or computer is programmed or configured to automatically prevent an external penalty brake request 114 from triggering a pneumatic emergency brake application based on the determination of the transmission of the TBC to the at least one railroad car based on a determination that the TBC is greater than or equal to a 100% command by controlling a relay 118 on a signal path to an external safety relay 116 to open to prevent the external penalty brake request 114 from triggering the pneumatic emergency brake application via the external safety relay. For example, the PSC 110 is programmed or configured to control the SPST NC relay 118 to open for all values of the TBC greater than or equal to 100%. The external penalty brake request 114 can be a high or low signal value (1 or 0 value). Although discussed with respect to a relay, preferred and non-limiting embodiments are not limited thereto, and the second controller or computer can be programmed or configured to automatically implement or facilitate a pneumatic emergency brake application by controlling a logic gate or the like to apply or withhold the external penalty brake request 114 on the signal path to the external safety relay 116.

A pneumatic emergency brake application is an irreversible application of the train brakes that overrides any operator-initiated command and uses air-pressure only, independent of the ECP Trainline 102, to apply brakes and stop the train (TR). The pneumatic emergency brake application opens a brake pipe dump valve which results in immediate discharge of the brake pipe of the train (TR), and an immediate application of the brakes on all cars to an emergency level. This sudden and non-graduated removal of air from the brake pipe increases in-train forces and results in depletion of all air, which requires a lengthy recharging and testing of the entire brake system before the train may continue its travel, and the car reservoirs will not begin to recharge until the brake pipe is recharged by the operator. In contrast, ECP braking in response to a TBC (e.g., TBC=120% or some lesser or reduced brake command), results only in a partial depletion of the quantity of air in the car reservoirs needed to apply the brakes, as opposed to depletion of the air in the brake pipe. Further, while in an ECP brake application, the car reservoirs can begin to charge back to their full capacity from the charged brake pipe.

The external penalty brake request 114 can be generated by an external safety system to override the operator control of the train. For example, an over speed train, a cab signal resulting from the train encroaching a red zone, PTC systems that ensure a train is in an authorized area, a vigilance system that ensures an operator has not fallen asleep, etc., can generate the external penalty brake request 114.

Figure 3:
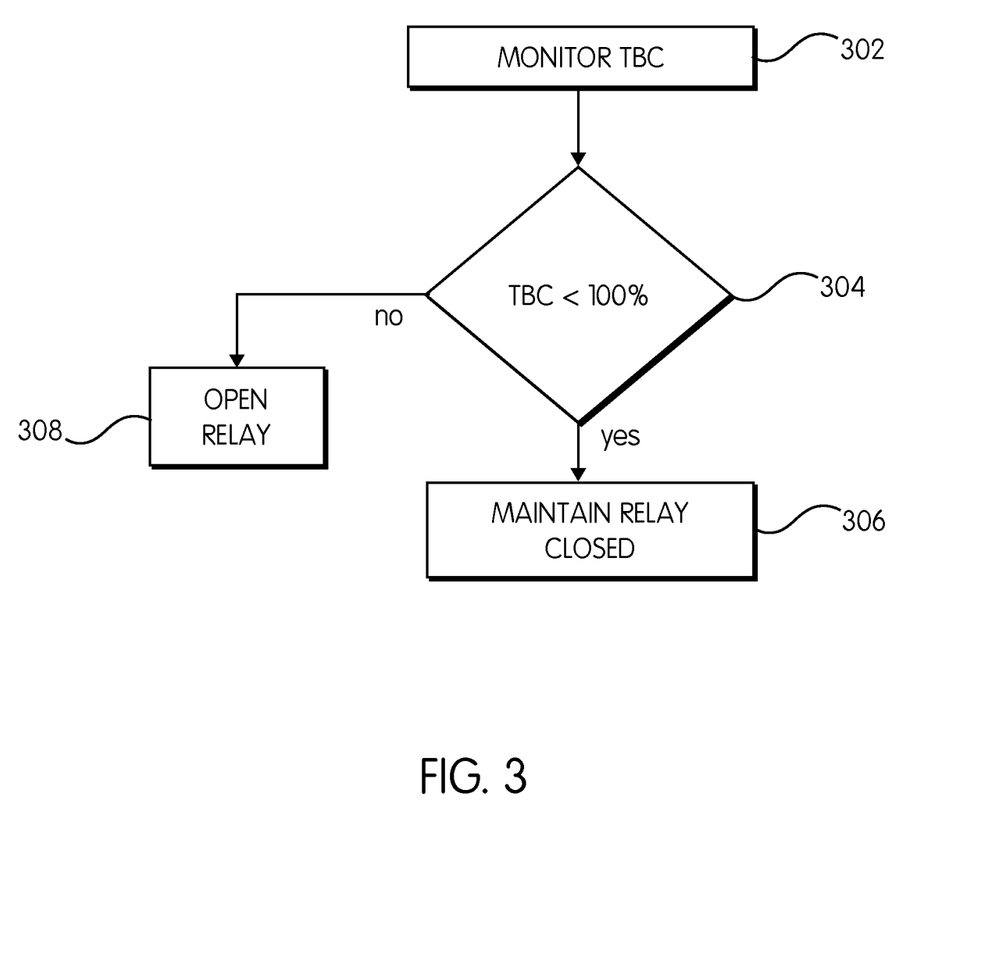
FIG. 3 is a flow chart illustrating a train control method according to principles of the present invention.

Referring now to FIG. 3, and with continued reference to FIG. 2, stage 302 the PSC is programmed or configured to monitor the ECP trainline 102 for a TBC issued by the HEU 108. If no external penalty brake request 114 is present, the PSC 110 is programmed or configured to determine at stage 304 whether a TBC of less than 100% is present on the ECP trainline 102. If the PSC 110 determines that a TBC of less than 100% is present on the ECP trainline 102, the PSC 110 is programmed or configured to not energize the relay 118, i.e., to allow the relay 118 to remain closed in the default state in stage 306. Because no external penalty brake request 114 is present, the state of the relay 118 is somewhat inconsequential and the external safety relay 116 is not energized. The train (TR) responds to operator ECP braking commands normally when no external penalty brake request 114 is present. However, by allowing the relay 118 to remain closed, if a new external penalty brake request 114 appears on the signal path, it can still trigger the external safety relay 116 in a situation where the TBC is less than 100% and, thus, not able to apply ECP braking sufficient for a penalty situation. The PSC 110 is programmed or configured to control the relay 118 to open for all other TBC values in stage 308, i.e., TBC greater than or equal to 100%. For example, if a TBC greater than or equal to 100% is present on the ECP trainline 102, ECP braking sufficient for a penalty situation can be applied without resorting to a pneumatic emergency brake application requiring a dump of the brake pipe.

If an external penalty brake request 114 is present, the PSC 110 is programmed or configured to determine at stage 304 whether a TBC less than 100% exists. The PSC 110 is programmed or configured to not energize the relay 118 in stage 306, i.e., to keep the relay 118 in the default closed state if a TBC less than 100% is present on the ECP trainline 102, thereby allowing the external penalty brake request 114 to trigger the pneumatic emergency braking by energizing the external safety relay 116, overriding any operator braking command, and pneumatically stopping the train (TR). For example, a TBC less than 100% when a penalty brake request is present can indicate that both an operator, e.g., due to operator error, and the ECP system, e.g., due to a single point failure, cannot or have not applied emergency ECP braking to address the penalty situation. The PSC 110 thus independently ensures that train brakes are applied for the penalty brake situation by ensuring that the external penalty brake request 114 can energize the external safety relay 116 to trigger pneumatic emergency braking. However, if the PSC 110 determines that a TBC greater than or equal to 100% is present on the ECP trainline 102 in stage 304, the PSC 110 is programmed or configured to open the relay 118 to prevent an external penalty brake application 114 from unnecessarily triggering a pneumatic emergency brake application.

Accordingly, a train control system and method according to preferred and non-limiting embodiments or aspects improves the safety of an ECP system by making ECP operations tolerant of HEU single-point failures by providing an independent means for ensuring that train brakes are applied in a penalty brake situation.

In this manner, provided is an improved train control system and method for use in an electronically-controlled pneumatic (ECP)-equipped train.

Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A train control system for use in an electronically-controlled pneumatic (ECP)-equipped train having a lead locomotive or control car, at least one railroad car and, optionally, at least one trailing locomotive or control car, the system comprising:
on the lead locomotive or control car:
a first controller or computer programmed or configured to generate a train brake command and directly or indirectly transmit the train brake command to the at least one railroad car; and
a second controller or computer separate from the first controller or computer and programmed or configured to determine transmission of the train brake command to the at least one railroad car, wherein the second controller or computer is programmed or configured to determine transmission of the train brake command on a trainline connecting the lead locomotive or control car to the at least one railroad car.

2. A train control system for use in an electronically-controlled pneumatic (ECP)-equipped train having a lead locomotive or control car, at least one railroad car and, optionally, at least one trailing locomotive or control car, the system comprising:
on the lead locomotive or control car:
a first controller or computer programmed or configured to generate a train brake command and directly or indirectly transmit the train brake command to the at least one railroad car; and
a second controller or computer separate from the first controller or computer and programmed or configured to determine transmission of the train brake command to the at least one railroad car, wherein the second controller or computer is programmed or configured to determine transmission of the train brake command on a wireless communication protocol to the at least one railroad car.

3. A train control system for use in an electronically-controlled pneumatic (ECP)-equipped train having a lead locomotive or control car, at least one railroad car and, optionally, at least one trailing locomotive or control car, the system comprising:
on the lead locomotive or control car:
a first controller or computer programmed or configured to generate a train brake command and directly or indirectly transmit the train brake command to the at least one railroad car; and
a second controller or computer separate from the first controller or computer and programmed or configured to determine transmission of the train brake command to the at least one railroad car, wherein the second controller or computer is programmed or configured to automatically implement or facilitate a pneumatic emergency brake application based on the determination of the transmission of the train brake command to the at least one railroad car.

4. The train control system of claim 3, wherein the second controller or computer is programmed or configured to automatically implement or facilitate an external penalty brake request to trigger the pneumatic emergency brake application.

5. The train control system of claim 4, wherein the second controller or computer is programmed or configured to automatically implement or facilitate the external penalty brake request to trigger the pneumatic emergency brake application based on a determination that the train brake command is less than a 100% command.

6. The train control system of claim 5, wherein the second controller or computer is programmed or configured to automatically implement or facilitate the external penalty brake request to trigger the pneumatic emergency brake application by allowing a relay on a signal path to an external safety relay to remain closed to allow the external penalty brake request to trigger the pneumatic emergency brake application.

7. A train control system for use in an electronically-controlled pneumatic (ECP)-equipped train having a lead locomotive or control car, at least one railroad car and, optionally, at least one trailing locomotive or control car, the system comprising:
on the lead locomotive or control car:
a first controller or computer programmed or configured to generate a train brake command and directly or indirectly transmit the train brake command to the at least one railroad car; and
a second controller or computer separate from the first controller or computer and programmed or configured to determine transmission of the train brake command to the at least one railroad car, wherein the second controller or computer is programmed or configured to automatically prevent an external penalty brake request from triggering a pneumatic emergency brake application based on the determination of the transmission of the train brake command to the at least one railroad car.

8. The train control system of claim 7, wherein the second controller or computer is programmed or configured to automatically prevent the external penalty brake request from triggering the pneumatic emergency brake application based on a determination that the train brake command is greater than or equal to a 100% command.

9. The train control system of claim 7, wherein the second controller or computer is programmed or configured to automatically prevent the external penalty brake request from triggering the pneumatic emergency brake application by controlling a relay on a signal path to an external safety relay to open to prevent the external penalty brake request from triggering the pneumatic emergency brake application via the external safety relay.

10. The train control system of claim 1, wherein the second controller or computer comprises a power supply controller.

11. A computer-implemented method for use in an electronically-controlled pneumatic (ECP)-equipped train having a lead locomotive or control car, at least one railroad car and, optionally, at least one trailing locomotive or control car, the method comprising:
generating, by a first controller or computer on the lead locomotive or control car, a train brake command and directly or indirectly transmitting the train brake command to the at least one railroad car; and
determining, by a second controller or computer on the lead locomotive or control car and separate from the first controller or computer, transmission of the train brake command to the at least one railroad car, wherein the determining transmission of the train brake command comprises determining transmission of the train brake command on a trainline connecting the lead locomotive or control car to the at least one railroad car.

12. A computer-implemented method for use in an electronically-controlled pneumatic (ECP)-equipped train having a lead locomotive or control car, at least one railroad car and, optionally, at least one trailing locomotive or control car, the method comprising:
generating, by a first controller or computer on the lead locomotive or control car, a train brake command and directly or indirectly transmitting the train brake command to the at least one railroad car; and determining, by a second controller or computer on the lead locomotive or control car and separate from the first controller or computer, transmission of the train brake command to the at least one railroad car, wherein the determining transmission of the train brake command comprises determining transmission of the train brake command on a wireless communication protocol to the at least one railroad car.

13. A computer-implemented method for use in an electronically-controlled pneumatic (ECP)-equipped train having a lead locomotive or control car, at least one railroad car and, optionally, at least one trailing locomotive or control car, the method comprising:

generating, by a first controller or computer on the lead locomotive or control car, a train brake command and directly or indirectly transmitting the train brake command to the at least one railroad car;

determining, by a second controller or computer on the lead locomotive or control car and separate from the first controller or computer, transmission of the train brake command to the at least one railroad car; and automatically implementing or facilitating a pneumatic emergency brake application based on the determination of the transmission of the train brake command to the at least one railroad car.

14. The method of claim 13, further comprising automatically implementing or facilitating an external penalty brake request to trigger the pneumatic emergency brake application.

15. The method of claim 14, further comprising automatically implementing or facilitating the external penalty brake request to trigger the pneumatic emergency brake application based on a determination that the train brake command is less than a 100% command.

16. The method of claim 15, further comprising automatically implementing or facilitating the external penalty brake request to trigger the pneumatic emergency brake application by allowing a relay on a signal path to an external safety relay to remain closed to allow the external penalty brake request to trigger the pneumatic emergency brake application.

17. A computer-implemented method for use in an electronically-controlled pneumatic (ECP)-equipped train having a lead locomotive or control car, at least one railroad car and, optionally, at least one trailing locomotive or control car, the method comprising:

generating, by a first controller or computer on the lead locomotive or control car, a train brake command and directly or indirectly transmitting the train brake command to the at least one railroad car;

determining, by a second controller or computer on the lead locomotive or control car and separate from the first controller or computer, transmission of the train brake command to the at least one railroad car; and automatically preventing an external penalty brake request from triggering a pneumatic emergency brake application based on the determination of the transmission of the train brake command to the at least one railroad car.

18. The method of claim 17, further comprising automatically preventing the external penalty brake request from triggering the pneumatic emergency brake application based on a determination that the train brake command is greater than or equal to a 100% command.

19. The method of claim 17, further comprising automatically preventing the external penalty brake request from triggering the pneumatic emergency brake application by controlling a relay on a signal path to an external safety relay to open to prevent the external penalty brake request from triggering the pneumatic emergency brake application via the external safety relay.

20. A computer-implemented method for use in an electronically-controlled pneumatic (ECP)-equipped train having a lead locomotive or control car, at least one railroad car and, optionally, at least one trailing locomotive or control car, the method comprising:

generating, by a first controller or computer on the lead locomotive or control car, a train brake command and directly or indirectly transmitting the train brake command to the at least one railroad car;

determining, by a second controller or computer on the lead locomotive or control car and separate from the first controller or computer, transmission of the train brake command to the at least one railroad car; and implementing or facilitating an ECP penalty brake application based on the determination of the transmission of the train brake command to the at least one railroad car.

21. A train control system for use in an electronically-controlled pneumatic (ECP)-equipped train having a lead locomotive or control car, at least one railroad car and, optionally, at least one trailing locomotive or control car, the system comprising:

on the lead locomotive or control car:
a first controller or computer programmed or configured to generate a train brake command on a trainline connecting the lead locomotive or control car to the at least one railroad car; and
a second controller or computer programmed or configured to monitor the trainline for the train brake command and control application of a pneumatic emergency brake based on a presence of the train brake command on the trainline.

* * * * *